E. L. COX.
ARTIFICIAL BAIT.
APPLICATION FILED MAR. 29, 1909.

975,833.

Patented Nov. 15, 1910.

WITNESSES

INVENTOR
Edward L. Cox
BY
ATTORNEYS

UNITED STATES PATENT OFFICE.

EDWARD LAFAYETTE COX, OF ALAMOSA, COLORADO.

ARTIFICIAL BAIT.

975,833. Specification of Letters Patent. Patented Nov. 15, 1910.

Application filed March 29, 1909. Serial No. 486,371.

*To all whom it may concern:*

Be it known that I, EDWARD L. COX, a citizen of the United States, and a resident of Alamosa, in the county of Conejos and State of Colorado, have invented a new and Improved Artificial Bait, of which the following is a full, clear, and exact description.

The invention is an improvement in artificial fish baits, and has in view a bait in the form of a buoyant body which is practically indestructible and has the shining surface of the natural insect or minnow. To this end I cover the body of the bait with a quill and bind the quill about the ends of the body to keep out the water, the body or inner surface of the quill being preferably colored to imitate the insect or other bait which it is supposed to represent.

Reference is to be had to the accompanying drawings forming a part of this specification, in which similar characters of reference indicate corresponding parts in all the views.

Figure 1:
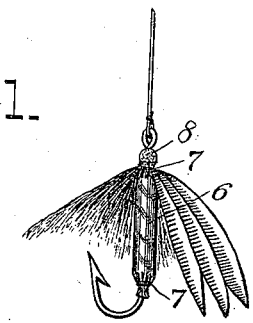
Figure 2:
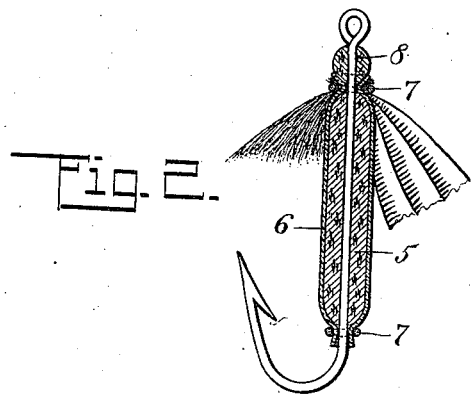

Figure 1 is a view of an artificial bait embodying my invention as applied to a hook; Fig. 2 is a central longitudinal section through the same; and Fig. 3 is a view of a modified form of the invention.

The bait constructed as shown in Figs. 1 and 2, comprises a relatively long body 5 of cork or such other floating material and has the general form of a fly or similar insect and is covered by a quill 6, the latter forming the prime feature of my improvement. The quill is bound around each end of the body by a gut 7, making the quill substantially water tight. The quill not only serves as a protective covering for the body but further imparts to it a shiny surface characteristic of certain natural baits and by reason of its yielding qualities and its animal origin is much like the natural bait to the bite of the fish. The ends of the quill are easily and closely tied without splitting, by first soaking the quill in warm water.

In that form of the invention shown in Figs. 1 and 2, the shank of the hook passes centrally through the body 5, as also the smaller body 8 forming the head of the insect and arranged at the top. The gut 7 binding the quill between the body 5 and the head 8 of the bait is in the form to represent an insect and also serves to secure the wings.

Figure 3:
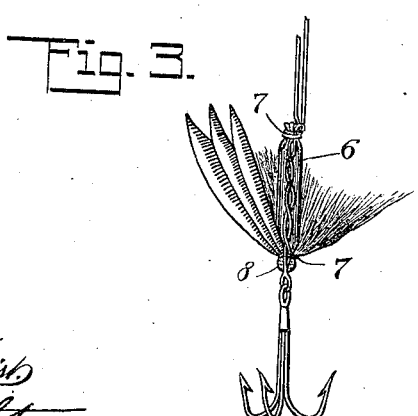

In Fig. 3 the construction of the bait is the same as shown in Figs. 1 and 2, except that the insect is inverted and is secured to the side of the line adjacent to the several hooks shown, instead of being mounted on the shank of a single hook.

The body 5 is ordinarily colored in a manner to simulate the insect it is supposed to represent, or the coloring is placed on the inside of the quill; in either case the same being visible at the outside of the bait and protected by the quill. It is not essential that the body 5 be placed within the quill, as the quill may alone form the body of the insect. It is best, however, that the quill be filled with some light solid material, in order that the walls of the quill will be well supported.

By the term " quill " as used in the specification and claims I mean the hard, horny, hollow part of any feather.

Having thus described my invention, I claim as new and desire to secure by Letters Patent:

1. In an artificial bait, a water-tight quill forming the body of the bait, and a relatively light material filling and supporting the walls of the quill.

2. In an artificial bait, a quill forming the body of the bait, and means bound about the ends of the quill, gathering it together and closing it at these points.

In testimony whereof I have signed my name to this specification in the presence of two subscribing witnesses.

EDWARD LAFAYETTE COX.

Witnesses:
JAMES SHEILDS ROBINSON,
JOHN SABINE.